United States Patent [19]
Neff et al.

[11] Patent Number: 5,310,064
[45] Date of Patent: May 10, 1994

[54] METHOD AND APPARATUS FOR SORTING COMPONENT PARTS OF AN ASSEMBLY PROCESS

[75] Inventors: Edward A. Neff, Ranco Santa Fe; Wayne D. Shapiro, Placentia, both of Calif.

[73] Assignee: Systems, Machines, Automation Components, Corp., Carlsbad, Calif.

[21] Appl. No.: 843,575

[22] Filed: Feb. 28, 1992

Related U.S. Application Data

[63] Continuation-in-part of Ser. No. 765,130, Sep. 21, 1991, Pat. No. 5,175,456.

[51] Int. Cl.⁵ ............................................. B07C 5/08
[52] U.S. Cl. .................................. 209/604; 209/659; 209/619; 73/1 J; 33/561
[58] Field of Search ............... 209/604, 605, 659, 619, 209/531, 532, 533; 73/1 J; 33/558, 561

[56] References Cited

U.S. PATENT DOCUMENTS

| | | | |
|---|---|---|---|
| 2,570,485 | 10/1951 | Rieber | 209/605 |
| 3,168,196 | 2/1965 | Harder | 209/605 |
| 3,539,006 | 11/1970 | Hanna et al. | 209/73 |
| 3,743,093 | 7/1973 | Klancnik | 209/80 |
| 3,975,261 | 8/1976 | Beck | 209/74 M |
| 4,049,123 | 9/1977 | Fegley et al. | 209/74 M |
| 4,287,769 | 9/1981 | Buckley | 737/627 |
| 4,561,825 | 12/1985 | Sakata | 414/753 |
| 4,576,286 | 3/1986 | Buckley et al. | 209/558 |
| 4,690,284 | 9/1987 | Buckley et al. | 209/590 |
| 4,750,272 | 6/1988 | Caddell | 33/558 |
| 4,922,434 | 5/1990 | Fule | 364/513 |

FOREIGN PATENT DOCUMENTS

0010168  1/1977  Japan .................................. 209/659

Primary Examiner—H. Grant Skaggs
Attorney, Agent, or Firm—Nydegger & Associates

[57] ABSTRACT

A method and apparatus for measuring and sorting component parts of an assembly includes a single station wherein parts are continuously fed, precisely measured, sorted by measurement, and then transported. For measuring the parts a contact member is mounted for extremely precise and controlled movements by a voice coil motor. The contact member is initially referenced with respect to a datum and is then placed into contact with the part. An optical encoder senses the position of the contact member to enable a determination of the critical dimension. The contact member includes a removable portion that is shaped to measure a desired critical dimension. This may include the height, inside diameter, outside diameter, roundness, or location of a feature of the part.

33 Claims, 6 Drawing Sheets

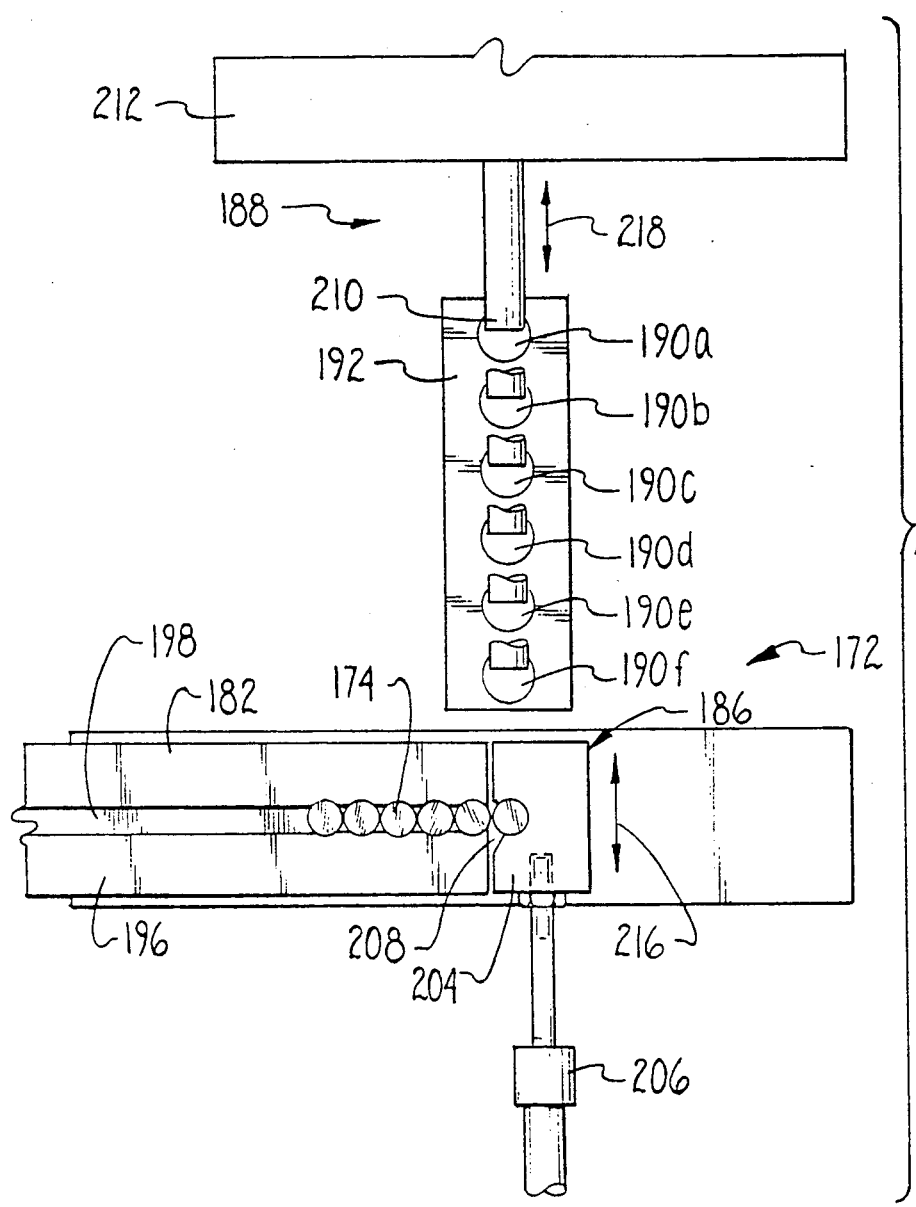
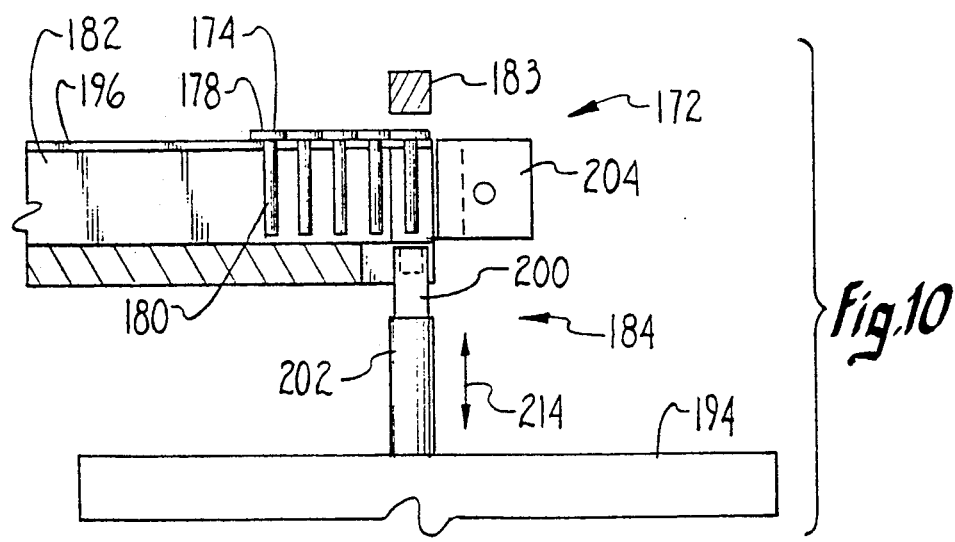

5,310,064

METHOD AND APPARATUS FOR SORTING COMPONENT PARTS OF AN ASSEMBLY PROCESS

CROSS-REFERENCE TO RELATED APPLICATIONS

This application is a continuation-in-part of application Ser. No. 07/765,130 entitled "Actuator", and filed on Sep. 21, 1991, and now U.S. Pat. No. 5,175,456.

TECHNICAL FIELD

This invention relates to the sorting and classifying of component parts for automated manufacturing and more particularly to a method and apparatus for sorting and classifying the component parts of an assembly based on precise measurements of the component parts.

BACKGROUND OF THE INVENTION

The high volume manufacture of some products requires the sorting and classifying of their component parts. For example, many products require the precise positioning and assembly of a variety of accurately manufactured parts to include extremely small and lightweight components. In general, such component parts must be formed with critical dimensions for a proper assembly. During manufacture these critical dimensions must be precisely measured and the parts sorted in lots corresponding to the specified dimensions. Sorting may be based on specific dimensioning of the parts or on the basis of good or reject parts.

As an example, parts may be formed in multi-cavity tooling where the critical dimensions may vary depending on the mold cavity. Products with very tight critical tolerances may often have many rejects due to tolerance match-ups of component parts that result in total tolerance variance outside of acceptable levels. A worst possible case is where a product is assembled with a tolerance variance right on the maximum allowable level. In this case, a product can pass final test and then fail in the field shortly after being placed into service.

Sorting machines for inspecting and separating specific component parts are well known in the prior art. Such sorting machines may use mechanical devices for measuring the parts such as the caliper device shown in U.S. Pat. No, 3,743,093 to Klancnik. In general such mechanical measuring devices are relatively slow and are limited with respect to the precision with which parts can be measured. They are typically limited to a few specially configured parts and are not easily reconfigured to adapt to other types of parts. U.S. Pat. Nos. 4,576,286 and 4,690,284 to Buckley et al disclose parts sorting systems in which wave energy of a single frequency is directed at the part. This wave energy is then analyzed to determine the dimensions and characteristics of the part. These prior art sorting systems also have certain short comings. Such sorting systems, for example, are relatively complicated and expensive and are also limited with respect to the precision of the measurements.

In addition to these limitations most prior systems are not designed to accomplish the inspection and sorting of a variety of accurately manufactured parts to include extremely small and light weight components. These operations require precision in both the movement of the component part into position for measurement, and in the force with which the component parts are handled and measured. Furthermore, for quality control purposes it is advantageous to verify that a part has been successfully moved through a particular station, inspected at the station, and the dimensional data transferred to a computer.

Another limitation of prior art sorting systems in general, is that separate stations are required for different functions of the system. As an example separate stations may be required for measuring a part, followed by stations for good part unload, bad part unload, and empty nest check. The requirement of multiple stations complicates such a sorting system, increases costs and limits the speed of the system In view of these limitations of the prior art, it is an object of the present invention to provide an inspecting-/sorting system in which a variety of manufactured parts, to include small and lightweight component parts can be handled and measured with extreme precision. It is a further object of the present invention to provide a sorting system in which parts can be measured with extreme precision at high speeds and at a single station. Yet another object of the present invention is to provide a sorting system in which replaceable measuring devices can be used to measure different features of parts such as the inside diameter, outside diameter, height, location, and run out of the part. Another object of the present invention is to provide a sorting system in which correct transport of a part through a measurement station

SUMMARY OF THE INVENTION

In accordance with the present invention a method and apparatus for sorting component parts prior to or during an assembly process is provided. The apparatus of the invention is formed as a single station in which parts are continuously fed into position, precisely measured, classified by measurement and sorted. The apparatus of the invention includes a contact rod that is mounted for extremely precise and measured movements. The contact rod is initially referenced with respect to a datum and is then placed in contact with the part such that a critical dimension of the part is measured. In an illustrative embodiment the contact rod is actuated with a voice coil motor to contact the part. An optical encoder senses the position of the contact rod to enable a determination of the critical dimension.

The part is then classified and sorted on the basis of the critical dimension. The contact rod includes a removable end member shaped to contact the part in a manner that yields the critical dimension. This may include the inside diameter, outside diameter, height, location of a feature, or runout of the part. The encoder feeds the inspected dimension to the computer, and computer control means are used to analyze the data and control operation of the apparatus.

The apparatus of the invention is adapted to sort component parts by a method that includes the steps of:
  providing a contact rod actuated by a voice coil motor for extremely precise movements;
  sensing a location of the contact rod with an optical encoder;
  positioning the rod to establish a reference datum with the encoder for the position of the rod relative to a reference surface;
  retracting the contact rod from the reference surface;
  initiating contact of the contact rod with the part and simultaneously measuring the position of the contact rod with the encoder to ascertain the critical dimension; and sorting the part according to the critical dimension.

Following sorting, the part may be transported according to predetermined instructions. Additionally transport of the component part may be verified as required.

The method and apparatus of the invention allows a part to be measured and then moved to a sort location in response to the measurement. Sorting may be on the basis of good or bad parts or on the basis of a more detailed classification. In addition to these classifications a determination of an empty nest can also be made.

In an alternate embodiment of the invention a first voice coil actuator is used to measure the part and a second voice coil actuator is used to sort the measured part. For measuring the part, the part is moved by the first voice coil actuator into contact with a reference surface. The measured part then transfers to a holding means and is moved over a sorting bin having a number of openings for classifying the parts. A wipe head controlled by the second voice coil actuator contacts the measured part at a location which strips the part from the holding means such that the part drops into a desired opening of the sorting bin.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 9 is a schematic plan view of an alternate embodiment apparatus for measuring and sorting component parts constructed in accordance with the invention; and FIG. 10 is a schematic elevation view of the alternate embodiment apparatus shown in FIG. 9.

DESCRIPTION OF PREFERRED EMBODIMENTS

Figure 1:
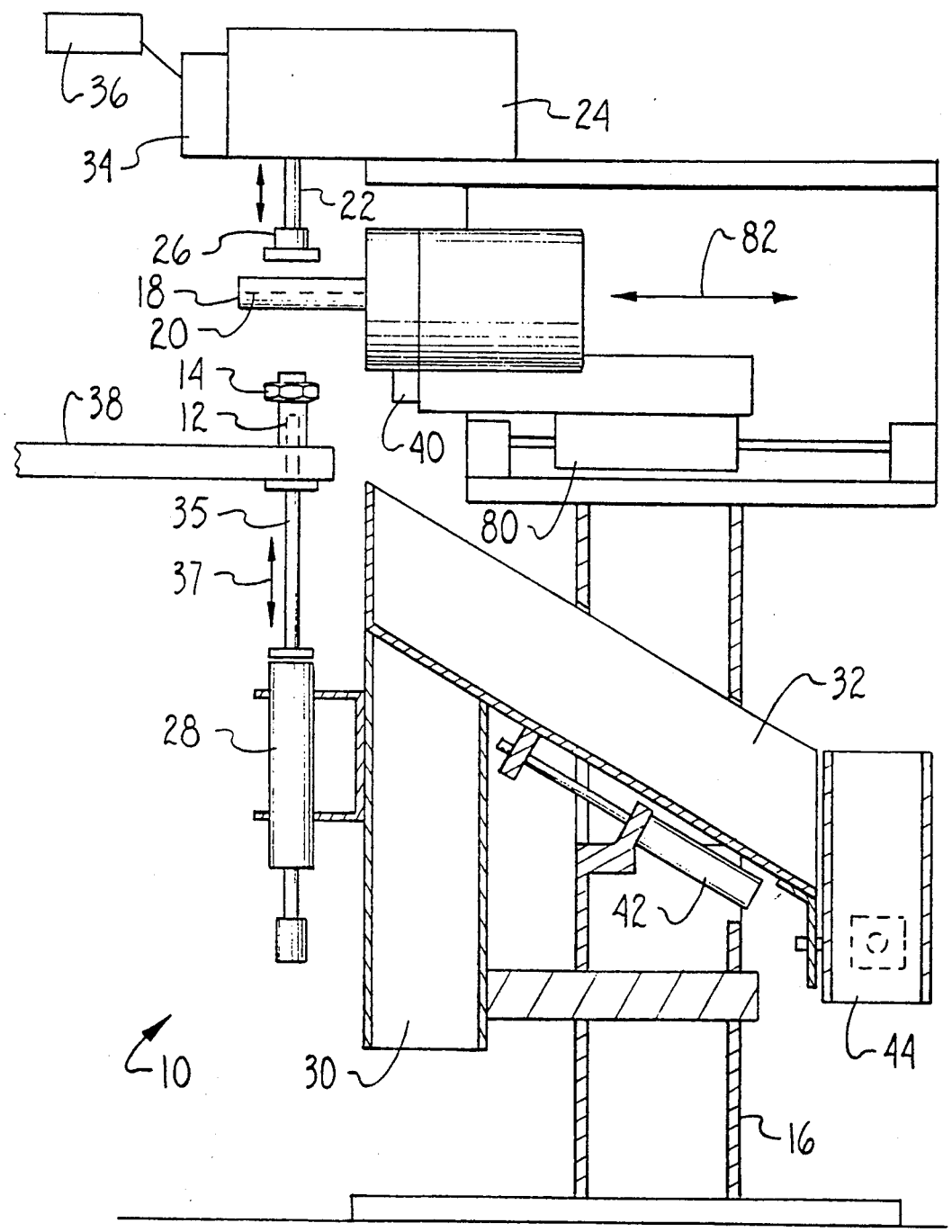
FIG. 1 is a schematic side elevational view of an apparatus for measuring and sorting component parts constructed in accordance with the invention.

Referring now to FIG. 1 a sorter apparatus constructed in accordance with the invention is shown and generally designated as 10. The sorter apparatus 10 is adapted to measure the critical dimensions of a component part 12. The component part 12 is generally cylindrical in shape and includes an inside diameter (ID), an outside diameter (OD), and a nut member 14 attached thereto. The sorter apparatus 10 is adapted to measure the height, ID, OD, and location of a feature such as the location of an orifice or opening (not shown) of the component part 12 relative to another surface. As will hereinafter be more fully explained each of these measurements is performed separately using different end members for a contact rod of the sorter apparatus 10. A measurement of the runout (i.e. determination of the roundness) of the component part 12 can also be performed using the alternate embodiment sorter apparatus shown in FIG. 3.

In addition to performing these critical measurements the sorter apparatus 10 is adapted to sort the component parts 12 into a classification of good parts or bad parts based on an analysis of the measurements. Additional or different classifications may also be possible. Additionally a determination of an empty nest may also be provided.

The sorter apparatus 10 broadly stated includes:

a base 16;

holding means in the form of pneumatically actuated gripper jaws 18 for holding the component part 14 for measurement and including a reference surface 20;

contact means in the form of a contact rod 22 for contacting and measuring a critical dimension of the component part 14 with the contact rod 22 mounted for precise movement by a linear voice coil motor 24 and having a removable contact member 26 shaped to determine a critical dimension of the component part 14;

measuring means in the form of an optical encoder 34 for precisely measuring a location of the contact rod 22 in order to ascertain the critical dimension, with the optical encoder 34 coupled to a microprocessor or computer 36 for compiling data and for controlling operation of the sorter apparatus 10; and sorting and transport means in the form of a lift cylinder 28 for opening the gripper jaws 18 and removing the component part 14 from the gripper jaws 18 for transport into a bad part chute 30 or a good part chute 32 in order to classify the component parts 12 according to the measured critical dimensions.

A sequence of operation of the sorter apparatus 10 and functional description of individual elements of the sorter apparatus 10 is as follows:

1. To begin a cycle of operation the contact rod 22 is moved by the voice coil motor 24 into contact with the reference surface 20 of the gripper jaws 18. The optical encoder 34 notes the position of the contact rod 22. This establishes a reference datum of the contact rod 22 with respect to the gripper jaws 18.

2. A component part 14 is then placed in the gripper jaws 18. This may be done at high speeds by automatic part indexing or feeding apparatus (not shown) which are known in the art. Depending on the shape of the part 14 to be measured, the gripper jaws 20 may be tooled to accommodate that particular shape. The gripper jaws 20 are preferably pneumatically actuated to alternately receive the part 14 for measurement and then release the part for sorting. The lift cylinder 28 may be constructed to bump a plunger 35 that enters the gripper jaws 18 to open the gripper jaws 20 and place the measured part on the index table 38. This motion is indicated by arrow 37. In addition the gripper jaws 18 may be mounted on a pneumatic slide 80 for reciprocable movement as indicated by arrows 82.

3. With a component part 14 in place in the gripper jaws 18, the contact rod 22 is again moved or extended by the voice coil motor 24 such that the contact member 26 of the contact rod 22 contacts the part 14. The position of the contact rod 22 is noted by the optical encoder 34. Using this information and the previously obtained reference data the critical dimension of the part can be determined and fed to the computer 36 (or microprocessor).

4. The contact rod is then retracted or moved back to a neutral position by the voice coil motor 24.

5. The measured part can then be sorted as required. In the illustrative embodiment of the invention this is accomplished by the lift cylinder 28 extending forcing the gripper jaws 18 open, picking the part out of the gripper jaws 18, and placing the part on an index table 38. A good part (as classified by the critical dimension) may be transferred from the index table 38 into the good part chute 32. A bad part may be transferred from the index table 38 into a bad part chute 30. Suitable mechanisms (not shown) are provided for pushing or otherwise transferring the measured parts 14 into the chutes 30 or 32. In addition, in the illustrative embodiment the good part chute 32 can be retracted by actuation of a cylinder 42 in order to allow access of a bad part to the bad part chute 30. A receptacle (not shown) may be placed below the bad part chute 30 for receiving the bad parts. A conveyor apparatus 44 may be coupled to the good part chute 32 for moving the good parts for assembly as required.

6. Verification of the movement of the measured part 14 through the sorter apparatus 10 can then be performed using suitable detection means such as a photosensor 40. The photosensor 40 may also indicate an empty nest condition wherein no part is available for measurement.

This is a general sequence of operation. The precise movement of the contact rod 22 is essential to the operation of the sorter apparatus 10. Accordingly, the voice coil motor 24 is adapted to precisely move the contact rod 22 into contact with the part 12. The exact position of the contact rod 22 is then ascertained and used to calculate the critical dimension. Contact pressure is preferably with a light force on the order of 0-200 grams. In some measurement applications it may be necessary to apply a precisely measured force to the part 12.

The contact member 26 which is removably mounted on the end of the contact rod 22 makes actual contact with the part 12. The contact member 26 must be formed in a manner that allows a critical dimension to be obtained from a determination of the linear position of the contact rod 22. Several different shapes for the contact member 26 are shown in FIGS. 2A-2D.

Figure 2A:
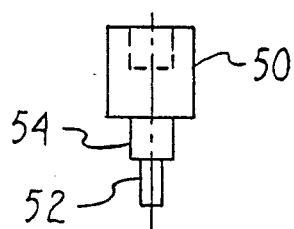
FIG. 2A is a schematic side elevational view of an end member of a contact rod of the apparatus of the invention adapted to measure an inside diameter of a part.

Contact member 50 shown in FIG. 2A is adapted to measure an inside diameter (ID) of the part 12. The contact member 50 includes two register pins 52,54. Register pin 52 is indicative of an acceptable inside diameter of the part 12. Register pin 54 has a diameter greater than register pin 52 and is indicative of an unacceptable inside diameter of the part 12. In use, the acceptable diameter register pin 52 will enter the inside diameter of the part 14 and produce a first linear position of the contact rod 22. If the inside diameter of the part 14 is oversized, register pin 54 will enter the inside diameter of the part 14 and produce a second linear position of the contact rod 22.

Figure 2B:
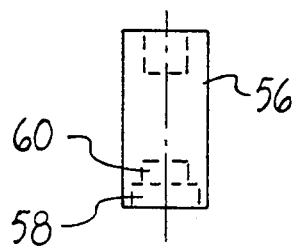
FIG. 2B is a schematic side elevational view of another end member of the contact rod of the apparatus of the invention adapted to measure an outside diameter of a part.

Contact member 56, shown in FIG. 2B, is adapted to measure an outside diameter of the part 12. The contact member 56 includes two counterbores. Counterbore 58 is indicative of an acceptable outside diameter of the part 12. Counterbore 60 has a diameter which is less than counterbore 58 and is indicative of an unacceptable outside diameter of the part 12. In use, a part with an acceptable outside diameter will register with counterbore 58 and produce a first linear position of the contact rod 22. If the outside diameter of the part 12 is undersized the part will register with counterbore 60 and produce a second linear position of the contact rod 22.

Figure 2C:
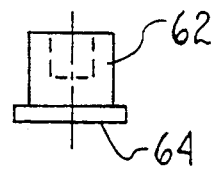
FIG. 2C is a schematic side elevational view of another end member of the contact rod of the apparatus of the invention adapted to measure a height of a part.

Contact member 62 shown in FIG. 2C is adapted to measure a height of the part 12. The contact member 62 includes a flat contact surface 64 that is adapted to contact the part and produce a linear position of the contact rod 22. This linear position can then be precisely determined by the encoder 34 and equated to the height of the part.

Figure 2D:
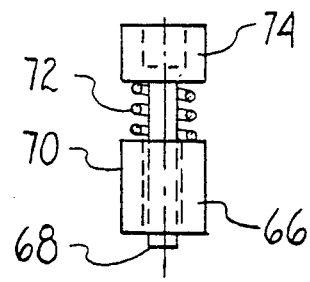
FIG. 2D is a schematic side elevational view of another end member of the contact rod of the apparatus of the invention adapted to measure a location of a part or feature of a part.

Contact member 66 shown is FIG. 2D is adapted to measure a dimension or location of a feature of the part. As an example it may be necessary with some assemblies to ascertain the location of an opening on the part relative to another surface of the part. For obtaining such a measurement the contact member 66 includes a body portion 74 for attachment to the contact rod 22. A register pin 68 is attached to the body portion. A sliding member 66 is slidably mounted over the register pin 68 and is separated from the body portion 74 by a compression spring 72. As an example, for making measurements of a feature of the part, the slide member 70 may contact a reference surface of the part using a force that is less than the spring force produced by spring 72. For measuring the location of the feature, the contact force can then be increased to overcome the spring force and the register pin 68 will contact the feature. The location of the contact rod 22 can be noted in both instances to ascertain the location of the feature.

Figure 3:
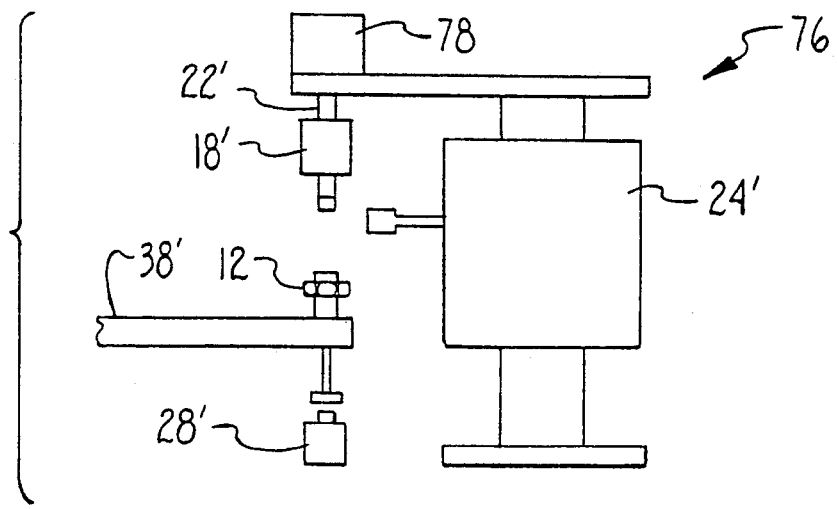
FIG. 3 is a schematic side elevational view of an alternate embodiment of the apparatus of the invention shown adapted to measure a runout or roundness of a part.

FIG. 3 illustrates an alternate embodiment sorter apparatus 76 for measuring the runout of a part. The alternate embodiment sorter apparatus 76 includes substantially the same components as the sorter apparatus 10. These elements include a voice coil motor 24′, pneumatic gripper 18′, index table 38′, and lift cylinder 28′. The contact rod 22′ however, is coupled to a rotary actuator such as a pneumatic rotator 78. Using this arrangement, rotary movement of the contact rod 22′ can be correlated to the linear position of the contact rod 22′ to measure the runout (i.e. roundness) of the part 12.

The voice coil motor 24 of the sorter apparatus 10 can be an actuator as disclosed in parent application Ser.

No. 07/765,130 which is incorporated herein by reference. Such an actuator is adapted to move the contact rod 22 in a precise manner and contact the part with a controlled light force. Additionally the position of the contact rod 22 must be precisely determined Referring to FIG. 4, a preferred embodiment of the actuator for the present invention is shown and generally designated 100. This embodiment of actuator 100 includes an electrical coil 102 which is shown here to be in a substantially flattened configuration. The actual shape of coil 102, however, is of minimal importance and will in large part be determined by the desires of the manufacturer. In fact, coil 102 could have been shown to by cylindrically configured. In any case, the windings of coil 102 must somehow be configured to surround a hollow space.

Figure 4:
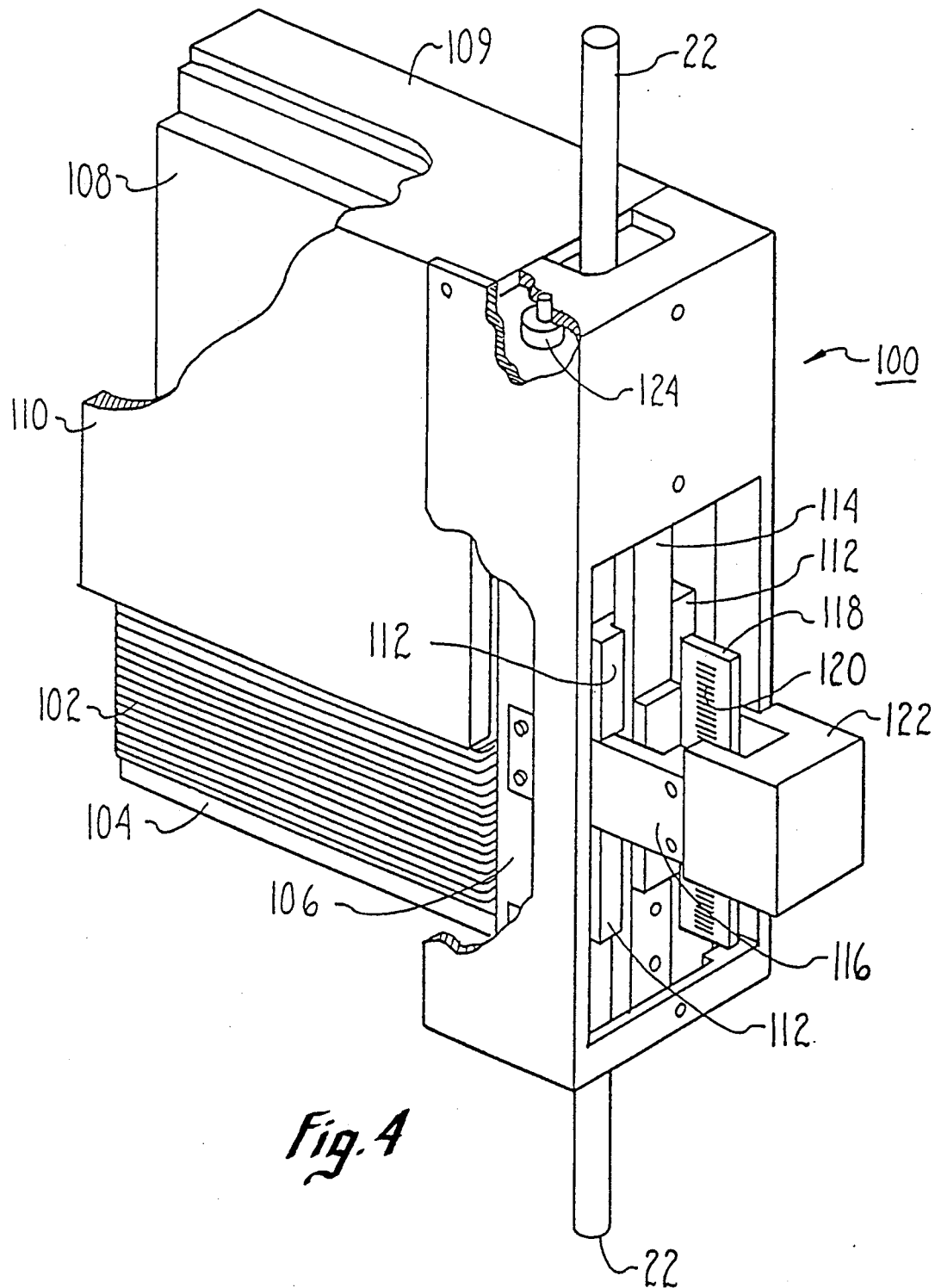
FIG. 4 is a perspective view with parts removed and partially cutaway of a linear voice coil motor or actuator suitable for use with the apparatus of the invention for precisely positioning the contact rod.

FIG. 4 shows the coil 102 wrapped around an extension 104 of a coil piston 106. Although this embodiment of actuator 100 shows a particular structure around which the coil 102 is wrapped, the skilled artisan will appreciate that coils are commercially available which do not require such structure. Such coils may, of course, be used with the present invention. Regardless, it is important that the coil 102 be physically attached to the coil piston 106 and able to move with the coil piston 106. Further, it is important for the present invention that the contact rod 22 be operatively attached to the coil piston 106 and able to move with the coil piston 106.

A magnet 108 is shown attached to the housing 109 of actuator 100 and a magnet return 110 is also shown attached to the housing 109 and distanced from the magnet 108 so that an effective flux field is established as the environment for the coil 102. Preferably, magnet 108 is a rare earth magnet having a permanent magnetic capability on the order of about 35 MEG oersted or greater. As intended for the present invention, the coil 102 actually surrounds magnet 108. This establishes a cooperation between the coil 102, the magnet 108 and the magnet return 110 in which a portion of the coil 102 is able to move between the magnet 108 and the magnet return 110.

The coil piston 106 is fixedly attached to a linear bearing 112 and the linear bearing 112 is slidingly mounted on a bearing rail 114. The bearing rail 114, in turn, is fixedly mounted to the housing 109. This arrangement allows the linear bearing 112 with its attached coil piston 106 and coil 102 to slidingly move within the housing 22. Consequently, because the windings of coil 102 are oriented substantially perpendicular to the flux field generated by the magnet 108, the application of an electrical current to the coil 102 will generate a force on the coil piston which causes the coil assembly (i.e. coil 102 and coil piston 106) to move within housing 109. This movement needs to be monitored and controlled.

Control over the movement of coil 102, and thus control over the contact rod 22 is achieved by monitoring the position of coil piston 106 relative to the housing 109. This is done using an encoder 122, such as a model SRL 4 encoder manufactured by Dynamics Research Corporation which is fixedly attached to the housing 109. More specifically, for actuator 100, a bracket 116 is fixedly attached to linear bearing 112 and a glass encoder slide 118, with a scale 120 etched or printed thereon, is fixedly attached to the bracket 116. Accordingly, glass encoder slide 116 moves together with both linear bearing 112 and coil piston 106. In a manner to be subsequently discussed in greater detail, the actuator 100 uses information from the encoder 122 regarding the position of glass slide 118 to precisely fix the position of coil piston 106, and thus the position of contact rod 22, relative to housing 22. Using this arrangement, accuracies on the order of five hundredths of a millimeter (0.05 m) have been attained for determining the actual position of the contact rod 22. Additionally, contact 22 rod can have a magnet (not shown) which is mounted on the contact rod 22 for movement therewith. Another magnet 124, shown fixedly mounted on the housing 109 is electrically activated to magnetically engage with the magnet on contact rod 22 to hold the contact rod 22 and its associated coil assembly in a detent or withdrawn configuration during the idle time for the actuator 100. The position of either the magnet 124 or the contact rod 22 can be adjusted to allow proper engagement of the contact rod 22 with the housing 109 in the detent position for contact rod 22.

Figure 5:
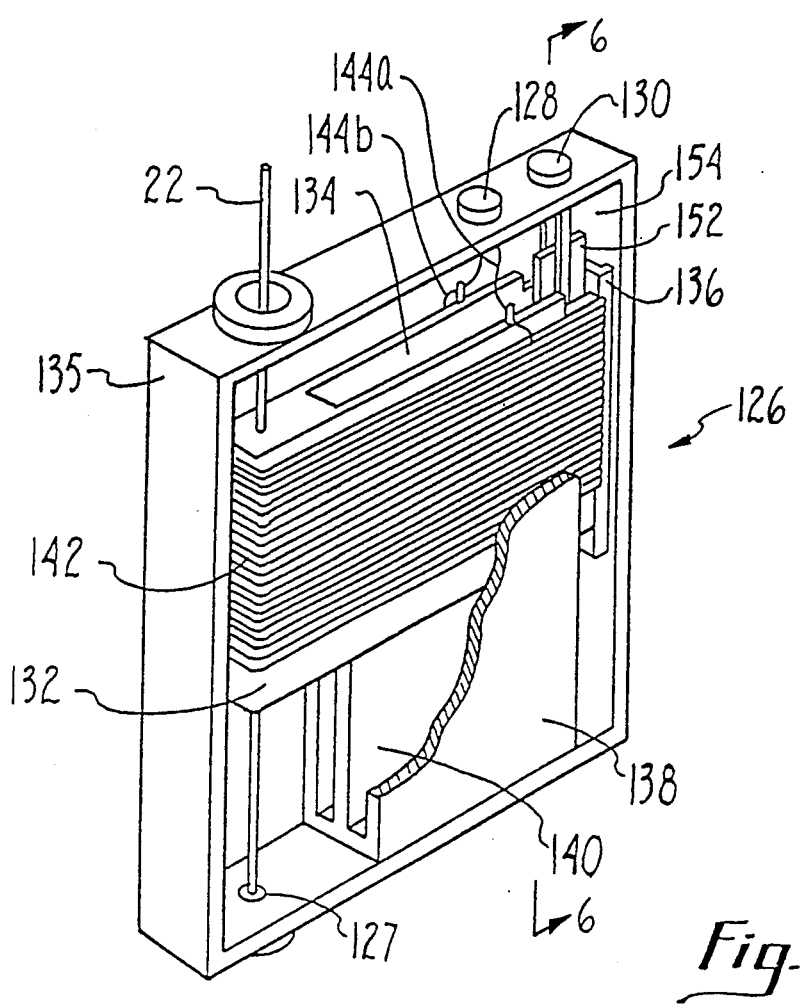
FIG. 5 is a perspective view with parts removed and partially cutaway of a linear voice coil motor or actuator suitable for use with the apparatus of the invention for precisely positioning the contact rod.

The details for an alternate embodiment of the voice coil motor 24 or actuator 126 will be appreciated with reference to FIG. 5 wherein it is seen that the alternate embodiment actuator 126 includes a bobbin 132 (similar to coil piston 106 for the preferred embodiment) which is formed with a hollow 134. Indeed, in most respects the alternate embodiment is similar to the preferred embodiment and the purposes are the same. As shown, the bobbin 132 is relatively flat, like housing 135, and is generally box shaped. Further, the bobbin 132 is slidingly attached to a slide mechanism 136 which is itself fixedly attached to the housing 135. Preferably, this mechanism 136 is a very light precision way to create minimal friction forces during movement of the bobbin 132. The mechanism 136 can be established in any of several ways, all known in the pertinent art, and can be provided with travel stops which will limit the distance through which bobbin 132 can travel along the mechanism 136. Preferably, the extent of this travel is in the range of between two and four inches (2-4 inches). Consequently, the bobbin 132 is able to slide freely along the mechanism 136 and to reciprocate within the housing 135 through this distance. It is also important to recognize that the contact rod 22 is attached to the bobbin 132 for linear movement with the bobbin 132.

FIG. 5, also shows that a magnet 138 is mounted inside the housing 22. Specifically, the magnet 138 is formed with a projection 140 and is positioned inside the housing 135 so that the projection 140 of magnet 138 extends into the hollow 134 of the bobbin 132. Preferably, the magnet 138 is of a commercially available type which is made of a rare earth element. For example, a Neodenium 35 megagaussoersted magnet is suitable for use in the present invention. Further, it is preferable that the magnet 138 be a permanent magnet which is capable of operating with a magnetic intensity on the order of approximately thirty-five MEG oersted (35 MOe). When the magnetic 138 is positioned in housing 135 as shown in FIG. 5, it will be appreciated by the skilled artisan that the poles of magnet 138 can be oriented on the housing 135 to effectively establish a magnetic field having flux lines that are aligned substantially perpendicular to the directions along which the bobbin 132 reciprocates in the housing 135.

The actuator 126 also includes a coil 142 which is made from an electrical wire 144 that is wound around the bobbin 132. Importantly the winding of coil 142 around the bobbin 132 should be sufficiently tight to effectively join coil 142 to the bobbin 32. The ends 144a and 144b of the electrical wire 44 are electrically attached to a connector ,128 so that an external voltage source 146 (shown in FIG. 8) can be used to energize the coil 142. As will be appreciated by those skilled in the pertinent art, with the coil 142, located in the magnetic field that is generated by the magnet 138, when a current from voltage source 146 is passed through the coil 142 a force is imposed on the bobbin 132 that will move the bobbin 132 within the housing 135. Depending on the amount, the direction, and the duration of the current which is passed through coil 142, the force which is generated on the bobbin 132 can be controlled. Preferably, the magnitude of the forces generated on the bobbin 132 will be in a range ten thousand grams (0-10000 grams). As from zero to ten thousand grams (0-10000 grams). As intended for the present invention the actuator 126 (FIG. 5) as well as the actuator 100 (FIG. 4) will likely operate in a range where approximately zero to two thousand grams (0-2000 gm) variable of force are selectively applied with a deviation of only plus or minus one gram ($\pm 1$ gm). Further, as is well known in the pertinent art and as indicated above, the position and direction of travel of the bobbin 132 can be controlled by the magnitude and direction of flow of current through the coil 142.

Figure 6:
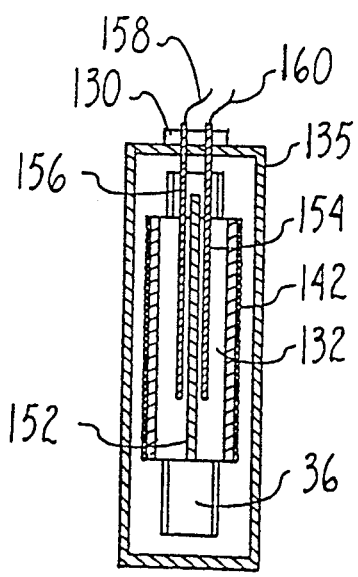
FIG. 6 is a cross section taken along section line 6—6 of FIG. 5.
Figure 8:
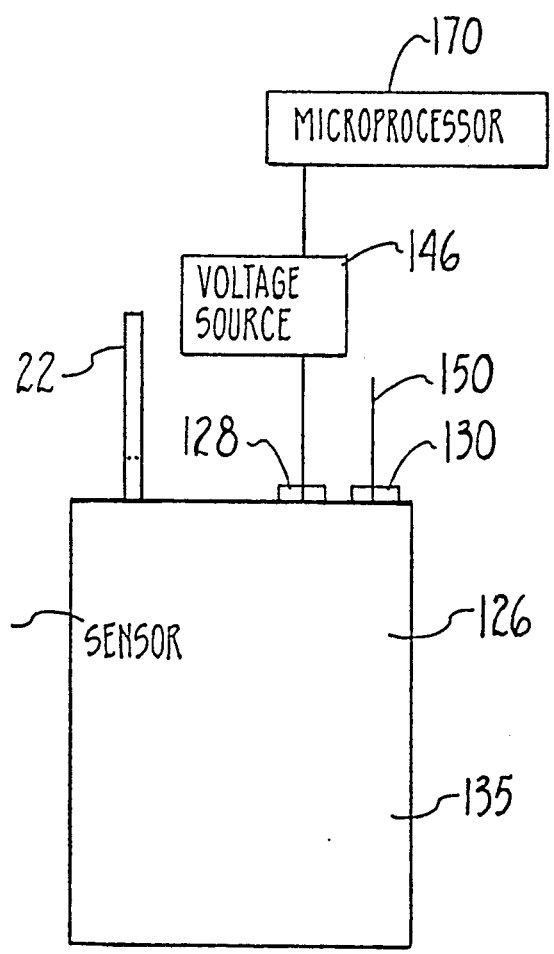
FIG. 8 is a schematic diagram of the electrical connections between various components of an actuator for the apparatus of the invention.

For the operation of the actuator 126, it is important to be able to determine the positional relationship between the bobbin 132 and the housing 135. To do this, several position sensors can be suggested. Referring for the moment to FIG. 8, it will be seen that a sensor 148 is incorporated into the actuator 126 and is operatively connected through a line 150 to a sensor connector 130 located on housing 135 of actuator 126. Further, line 150 completes the connection between sensor connector 130 and a microprocessor 170 which is operatively associated with the computer 36. In one embodiment the position sensing function can be accomplished using a capacitance inductance (LVDT) sensor like the one shown in FIG. 6. There it will be seen that the actuator 126 can include a middle plate 152 which is fixedly mounted to the bobbin 132 for movement with the bobbin 132 in the housing 135. This middle plate 152 is then disposed between 154 and a plate 156 which are each fixedly connected to the housing 135 of actuator 135. Further, the plates 154 and 156 are respectively connected to lines 158 and 160 which, together, constitute the line 150 in this embodiment. Consequently, as middle plate 152 moves with the bobbin 132, the electrical capacitance between the plate 154 and 156 will be changed. This change in capacitance can be determined by the sensor 148 by means well known in the art to ascertain the position of the bobbin 132 relative to the housing 135. The flat plates remove concentricity problems and, as they are located away from the coil [a heat source], the sensor will be accurate.

Figure 7:
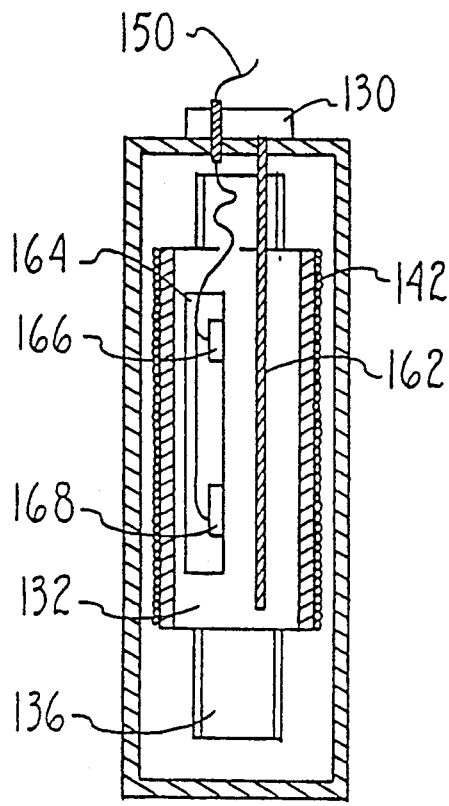
FIG. 7 is a cross section equivalent to FIG. 6 of an alternate embodiment of the actuator shown in FIG. 5.

In an alternate embodiment of the sensor 148, the capacitive elements comprising the plates 152, 154 and 156 are removed and, instead, a photo-electric system much like the encoder 122 previously discussed in conjunction with the actuator 100 is incorporated. Specifically, a scale 162 is fixedly attached to the housing 135 and, as indicated by cross-referencing FIGS. 6 and 7, the scale 162 is generally located in the same position as was the plate 154 in the embodiment previously disclosed for the sensor 148. Additionally, a photoelectric detector 164 is fixedly mounted on the bobbin 132 for movement therewith. The detector 164 Can include photodiode elements 166 and 168 which, either individually or collectively, will interact optically with the scale 162, in a manner well known in the pertinent art, to provide information about the position of the bobbin 132 relative to the housing 135.

ALTERNATE EMBODIMENT

An alternate embodiment measuring and sorting apparatus constructed in accordance with the invention is shown in FIGS. 9 and 10 and generally designated 172. The alternate embodiment measuring and sorting apparatus 172 is adapted to measure the length of parts 174 which are continuously fed into the apparatus 172. As shown in FIG. 10, each part 174 is generally nail shaped and includes a cylindrical body 180 and an enlarged cylindrical head 178.

The measuring and sorting apparatus 172 broadly stated, includes a feed means 182 for automatically feeding parts 174, a fixed reference member 183 to establish a reference point for measurement of the parts 174, a voice coil measuring means 184 for moving each part 174 into contact with the reference member 183, a holding means 186 for holding and transporting each part 174 for sorting after measurement, and a voice coil actuated stripping means 188 for stripping each measured part 174 from the holding means 186 at a location that enables the measured part to drop into an opening 190a-f of a sorting bin 192.

The feed means 182 for the measuring and sorting apparatus 172 is adapted to continuously feed the parts 174 into the apparatus 172 along a slotted track 196. As an example, a suitable feed means 182 can be a vibrating linear feed mechanism. Such linear feed mechanisms are well known in the art. In general, the parts 174 hang in a slot 198 of a track 196 of the linear feed mechanism and are pushed along by vibratory motion.

The measuring means 184 includes a lift cup 200 for moving or lifting each part 174 into contact with the fixed reference member 183. The lift cup 200 is actuated by a first voice coil actuator 194. The voice coil actuator 194 includes a rod member 202 that is connected to the lift cup 200. The location of the rod member 202 of the voice coil actuator 194 can be precisely ascertained by the methods previously described. Using this location and a reference obtained by an initial contact of the lift cup 200 with the fixed reference member 183, the length of each part 174 can be precisely measured (i.e. to about ten thousandths of an inch).

After measurement, a measured part 174 is pushed into the holding means 186. The holding means 186 includes a jaw member 204 (FIG. 9) that is adapted to be axially displaced by a slide cylinder 206. The slide cylinder 206 can be a conventional pneumatic or hydraulic linear motion cylinder (i.e. a dumb cylinder). The jaw member 204 of the holding means 186 includes a flared opening 208 for receiving a measured part 174. The parts 174 are pushed into the flared opening 208 of the jaw 204 by the feed means 182. Each part 174 freely hangs in the flared opening 208 of the jaw member 204 suspended on the head 178 of the part 174. Axial displacement of the jaw member 204 by the slide cylinder 206 moves a measured part over the sorting bin 192. The sorting bin is located below the jaw member 204. The stripping means 188 is adapted to contact and strip the part 174 from the jaws 204 such that the part drops into a desired opening 190a-f of the sorting bin 192. This classification is based on the length of the part 174.

The stripping means 188 includes a wipe head 210 that is adapted to contact a measured part 172 in the jaw member 204 of the holding means 186 as the jaw member 204 is moved axially along the sorting bin 192 by the slide cylinder 206. The wipe head 210 is precisely positioned by a second voice coil actuator 212 to strip the part 174 from the jaw member 186 at a location that allows the part 174 to be dropped into a desired or predetermined opening 190a-f of the sorting bin 192 that corresponds to the previously measured length of the part 174. As is apparent precise positioning of the wipe head 210 can be accomplished by operation of the voice coil actuator 212 as previously described. The shape of the flared opening 208 of the jaw member 204 is substantially as shown in FIG. 9 and is such that the part 174 is stripped from the jaw member 204 upon contact with the wipe head 210.

The measuring and sorting apparatus 172 thus functions to measure the length of each part 174 and to drop the measured part 174 into an opening 192a-f of the sorting bin 192 for classification by size. Suitable computer control apparatus may be provided for recording the data (i.e. length of each part) and for controlling operation of the separate components. A representative sequence of operation of the measuring and sorting apparatus 172 is as follows:

1. Prior to a sequence of operation, the lift cup 200 is moved by the first voice coil actuator 194 into contact with the fixed reference member 183. This provides initial reference data which is recorded by the computer.

2. The parts 174 are continuously advanced by the linear feed mechanism 182 for measurement and then into the jaw member 204 of the holding means 186.

3. Each part 174 is measured by the first voice coil actuator 194 extending the lift cup 200 to lift the part 174 into contact with the reference member 183. The length of the part 174 is thus ascertained using the position of the rod 202 of the voice coil actuator 194 and the reference data as previously described. This measured length of the part 174 is used for sorting the parts 174 according to the length.

4. After measurement of a part 174, the voice coil actuator 194 retracts the measured part 174 from contact with the reference member 183. The motion of the lift cup 200 is denoted by arrow 214.

5. The measured part 174 is then advanced by the linear feed mechanism 182 into the jaw member 204. As is apparent the advancing parts 174 continuously push the measured parts into jaw member 204.

6. The jaw member 204 loaded with a measured part 174 is then moved over the sorting bin 192 by the slide cylinder 206.

7. Depending on the dimension of the part 174 the wipe head 210 is precisely positioned by the second voice coil actuator 212 to contact and strip the part 174 from the jaw member 204 at a point such that the part 174 will drop into an opening 190a-f that corresponds to its dimension. The motion of the jaws 208 are indicated by arrow 216. The different positions of the wipe head 210 over the different openings 190a-f are also shown. The motion of the wipe head 210 is indicated by arrow 218.

Thus the invention provides an apparatus and method for measuring and sorting component parts of an assembly with extreme precision. While the disclosed apparatus and method as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. An apparatus for measuring and sorting parts, comprising:

holding means for holding a part for measurement and having a reference surface associated therewith;

contact means including a contact member mounted for precisely controlled movement by a high speed electromagnetically driven actuator for contacting the reference surface and for contacting the part in the holding means;

measuring means for precisely determining a first position of the contact member while in contact with the reference surface and a second position of the contact member while in contact with the part in order to determine a measurement of the part; and sorting and transport means for removing the part from the holding means and for sorting the part according to the measurement.

2. The apparatus as defined in claim 1 and wherein:

the actuator comprises a motor including an electrical coil movable by a magnetic field, for moving the contact member.

3. An apparatus for measuring and sorting parts, comprising:

holding means for holding a part for measurement and having a reference surface associated therewith;

contact means including a contact member mounted for precise movement by an actuator for contacting the reference surface and for contacting the part in the holding means;

measuring means for precisely determining a first position of the contact member while in contact with the reference surface and a second position of the contact member while in contact with the part in order to determine a measurement of the part; and sorting and transport means for removing the part from the holding means and for sorting the part according to the measurement;

wherein the actuator comprises:

means for creating a magnetic field;

an electrical coil for carrying a current, with the coil being disposed for movement within the magnetic field in response to current flow through the coil and with the contact member connected to the coil; and means electrically connected with the coil for providing the electrical current for positioning the contact member in contact with the reference surface and with the part.

4. The apparatus as defined in claim 3 and wherein the measuring means comprises:

an optical encoder for determining a position of the contact member.

5. The apparatus as defined in claim 3 and wherein:

the contact member comprises a contact rod with a removable contact member attached thereto formed to determine a dimension of the part.

6. The apparatus as defined in claim 5 and wherein:

the contact member includes a flat surface for contacting the part in order to ascertain a height of the part.

7. The apparatus as defined in claim 5 and wherein:
the contact member includes a first register pin for contacting an inside diameter of the part to indicate an acceptable inside diameter and a second register pin having a greater diameter than the first register pin for contacting an inside diameter of the part to indicate a non-acceptable inside diameter.

8. The apparatus as defined in claim 5 and wherein:
the contact member includes a first counterbore for contacting an outside diameter of the part to indicate an acceptable outside diameter and a second counterbore having a lesser diameter than the first counterbore to indicate a non-acceptable outside diameter.

9. The apparatus as defined in claim 5 and wherein:
the contact member includes a body member, a register pin attached to the body member, a slide member slidably attached to the register pin, and a compression spring between the body member and slide member for measuring a feature of the part from a reference surface.

10. The apparatus as defined in claim 5 and wherein:
the contact member is mounted for rotary movement in order to measure a roundness of the part.

11. An apparatus for measuring and sorting a component part of an assembly, comprising:
holding means in the form of gripper jaws for holding the component part for measurement and having a reference surface associated therewith;
contact means in the form of a contact rod for contacting and measuring a critical dimension of the component part in the holding means with the contact rod mounted for precise movement by a linear voice coil motor and having a removable contact member shaped to determine the critical dimension of the part;
measuring means in the form of an optical encoder for measuring a location of the contact rod while in contact with the reference surface and a location of the contact rod while in contact with the component part in order to determine the critical dimension; and
sorting means for removing the component part from the gripper jaws and for sorting the component part according to a classification based on the critical dimension.

12. The apparatus as defined in claim 11 and wherein:
the removable contact member is shaped to measure a critical dimension selected from the class consisting of, the height, the inside diameter, the outside diameter, or the roundness of the part.

13. The apparatus as defined in claim 11 and wherein:
the sorting means includes a lift cylinder for contacting and removing the component part from the gripper jaws.

14. The apparatus as defined in claim 13 and wherein:
the sorting means includes a good part chute for transporting good parts and a bad part chute for transporting bad parts.

15. The apparatus as defined in claim 11 and wherein the linear voice coil motor includes:
a housing;
means mounted to the housing for creating a magnetic field;
a bobbin slidably mounted on the housing and with the contact rod connected to the bobbin; and
means for generating an electrical current in the magnetic field, the current generating means being connected with the bobbin to move the bobbin in response to a generated electrical current to create forces for positioning the contact rod in contact with the component part.

16. The apparatus as defined in claim 15 and wherein the current generating means comprises:
a coil wrapped around the bobbin; and
a source of electrical current, the source being electrically connected with the coil.

17. The apparatus as defined in claim 16 and wherein:
the means for creating a magnetic field is a rate earth magnet.

18. An apparatus for continuously feeding, measuring and sorting parts comprising:
feed means for continuously feeding the parts;
contact means for placing a part into contact with a reference member including a first voice coil actuator having a rod member that can be precisely positioned;
measuring means for precisely determining a position of the rod member with the part in contact with the reference member in order to ascertain a dimension of the part;
holding means for holding the measured part; and
sorting means actuated by a second voice coil actuator for removing the part from the holding means and for sorting the part by measurement;
wherein the sorting means includes a jaw member for holding the part and a contact member actuated by the second voice coil actuator for removing the part from the jaw member.

19. The apparatus as claimed in claim 18 and wherein:
the sorting means includes a sorting bin with a plurality of openings and a contact member is positioned by the second voice coil motor to strip a measured part from the jaw member and into a desired opening of a sorting bin.

20. The apparatus as claimed in claim 19 and wherein:
the sorting bin is located below the jaw member and the jaw member is moved over the sorting bin with cylinder.

21. An apparatus for continuously feeding, measuring and sorting parts comprising:
feed means for continuously feeding the parts;
contact means for placing a part into contact with a reference member including a first voice coil actuator having a rod member that can be precisely positioned;
measuring means for precisely determining a position of the rod member with the part in contact with the reference member in order to ascertain a dimension of the part;
holding means for holding the measured part; and
sorting means actuated by a second voice coil actuator for removing the part from the holding means and for sorting the part by measurement;
wherein the contact means includes a lift cup for lifting a part into contact with the reference member.

22. An apparatus as claimed in claim 18 and wherein:
the feed means is a vibrating linear feed mechanism.

23. An apparatus for continuously feeding, measuring and sorting parts comprising:
feed means for continuously feeding the parts;

contact means for placing a part into contact with a reference member including a first voice coil actuator having a rod member that can be precisely positioned;

measuring means for precisely determining a position of the rod member with the part in contact with the reference member in order to ascertain a dimension of the part;

holding means for holding the measured part; and sorting means actuated by a second voice coil actuator for removing the part from the holding means and for sorting the part by measurement;

wherein the feed means is a vibrating linear feed mechanism;

and wherein the parts are advanced by the linear feed mechanism after measurement into the holding means.

24. The apparatus as claimed in claim 23 and wherein:
the holding means is moveable to sort the parts on the basis of a measurement of the part.

25. A method for measuring and sorting component parts which comprises the steps of:

providing a contact member actuated by a voice coil motor for precise movements;

sensing a location of the contact member with an optical encoder;

positioning the contact member to establish a reference datum with the encoder for the position of contact member relative to a reference surface;

retracting the contact member from the reference surface;

initiating contact of the contact member with the part and simultaneously measuring the position of the contact member with the encoder to ascertain the critical dimension; and sorting the part according to the critical dimension.

26. The method as recited in claim 25 and further comprising:
verifying successful sorting of the part.

27. The method as recited in claim 25 and further comprising:
verifying an empty nest wherein no part is available for measurement.

28. The method as recited in claim 25 and wherein:
initiating contact of the contact member is while holding the part.

29. The method as recited in claim 25 and wherein:
sorting is by good parts or bad parts classified according to a critical dimension.

30. The method as recited in claim 25 and further comprising;
providing a removable contact member shaped to measure a critical dimension.

31. The method as recited in claim 30 and wherein:
the contact member is shaped to measure an inside diameter of the component part.

32. The method as recited in claim 30 and wherein:
the contact member is shaped to measure an outside diameter of the component part.

33. The method as recited in claim 30 and wherein:
the contact member is shaped to measure a location of a feature of the component part.

* * * * *